United States Patent Office 3,563,963
Patented Feb. 16, 1971

3,563,963
PROCESS FOR THE PREPARATION OF MIXED POLYMERIZATES OF OLEFINIC COMPOUNDS
Gerhard Beier and Eduard Bermeister, Burghausen, Upper Bavaria, Germany, assignors to Wacker-Chemie G.m.b.H., Munich, Germany, a corporation of Germany
No Drawing. Filed Dec. 3, 1968, Ser. No. 780,879
Int. Cl. C08f 15/00
U.S. Cl. 260—79.3
5 Claims

ABSTRACT OF THE DISCLOSURE

This invention relates to an improvement in the process of copolymerizing alkenes having from 2 to 6 carbon atoms and free-radical-polymerizable monomers utilizing a catalyst system of (1) an inorganic or organic per-compound, (2) hydrogen and compounds splitting off hydrogen and (3) a colloidally dispersed noble metal, said improvement consisting of utilizing from 0.000001% to 0.01% by weight, based on the monomers utilized, of said colloidally dispersed noble metal in combination with metallic ions selected from the group consisting of iron, copper, nickel, cobalt, chromium, molybdenum, vanadium, cerium and mixtures thereof, wherein the amount of said metallic ions is from 0.01 to 10 gm./atom per gm./atom of said noble metal and does not exceed 0.001% by weight, based on the monomers utilized, and conducting said polymerization at a temperature between −50° C. and +50° C.

THE PRIOR ART

The preparation of copolymers of ethylene with vinyl esters or vinyl halides by means of free-radical polymerization is known. Such processes require, as also does the process for the preparation of high pressure polyethylene, relatively high pressures of from 1,000 to 2,000 atmospheres, in order to obtain economically justified polymerization velocities and sufficiently high molecular wiehgts of the polymerizates. Thus, costly and cumbersome apparatus is necessarily required.

The execution of polymerization at low pressures, as for example, the copolymerization of ethylene and vinyl esters in organic solvents is known. The removal of the solvent, however, makes this process an uneconomical one.

For the elimination of these disadvantages of the prior art, it has been proposed that the mixed polymerization of olefins with vinyl esters and the like be carried out in aqueous dispersion, utilizing a redox catalyst, consisting of inorganic or organic per-compounds and hydrogen in the presence of colloidally dispersed noble metals of the VIII subgroup of the Periodic Table (German Auslegeschrift 1,133,130). However, in this process, a partial or complete contamination of the colloidal noble metals occurs due to the impurities which are contained in the monomeric olefinic compounds or the polymerization adjuvants. Such impurities as, for example, sulfur compounds, phosphine, carbon monoxide, acetylene, etc. occur and generally cannot be avoided in technical monomers. However, purification of the monomers to remove traces of such impurities requires a considerable amount of technical and costly apparatus. Furthermore, the contamination of the colloidal noble metal catalysts causes a partial deactivation and leads to longer initiation periods or to slower polymerization velocities.

OBJECTS OF THE INVENTION

An object of the present invention is the development of an improved process for the copolymerization of alkenes and free-radical-polymerizable monomers utilizing a redox catalyst system including colloidally dispersed noble metals.

Another object of the present invention is, in the process for the preparation of copolymerizates from alkenes having from 2 to 6 carbon atoms and free-radical-polymerizable monomers which comprises the step of polymerizing said alkenes and said monomers in an aqueous dispersion utilizing a redox polymerization catalyst system comprising (1) an oxidizing agent selected from the group consisting of inorganic per-compounds, organic peroxides and organic hydroperoxides, (2) hydrogen and compounds splitting off hydrogen and (3) a colloidally dispersed noble metal of the VIII subgroup of the Periodic Table, the improvement which comprises utilizing from 0.000001% to 0.01% by weight, based on the monomers utilized, of said colloidally dispersed noble metal in combination with metallic ions selected from the group consisting of iron, copper, nickel, cobalt, chromium, molybdenum, vanadium, cerium and mixtures thereof, wherein the amount of said metallic ions is from 0.01 to 10 gm./atom per gm./atom of said noble metal and does not exceed 0.001% by weight based on the monomers utilized, and conducting said polymerization at a temperature between −50° C. and +50° C.

These and other objects of the present invention will become apparent as the description thereof proceeds.

DESCRIPTION OF THE INVENTION

Now a method has been discovered for the mixed polymerization of mono-olefins with from 2 to 6 carbon atoms, preferably 2 to 4 carbon atoms, and free-radical-polymerizable monomers in an aqueous dispersion utilizing a redox catalyst system, consisting of (1) organic and inorganic per-compounds, (2) hydrogen and compounds splitting off hydrogen and (3) colloidally dispersed noble metals of the VIII subgroup of the Periodic Table which avoids these disadvantages. The process is characterized in that the colloidally dispersed noble metals are utilized in amounts of from 0.000001% to 0.01% by weight, preferably from 0.00001% to 0.001% by weight, based on the monomers utilized, while adding ions of the metals, iron, copper, nickel, cobalt, chromium, molybdenum, vanadium, or cerium, either individually or in combination in amounts of from 0.01 to 10 gm./atom per gm./atom of noble metal, preferably from 0.1 to 5 gm./atom per gm./atom of noble metal, wherein the amount by weight of the added metal ions does not exceed 0.001% by weight, based on the amount of the monomers utilized and wherein the polymerization is executed at a temperature of from −50° C. to +50° C. It has proved particularly effective to add iron and/or copper ions to the polymerization recipe.

All noble metals of the subgroup VIII of the periodic system, that is, platinum, palladium, rhodium, ruthenium, osmium, and iridium, may be employed in colloidal form in the process of the invention. It is preferable to utilize them in the form of aqueous sols, the preparation of which is well known. It is advantageous to stabilize the sols against coagulation according to known methods by means of the addition of protective colloids, such as gelatins, gum arabic, polyvinyl alcohol, sodium albuminate, sodium alginate, etc. For economical reasons and due to its excellent catalytic properties, palladium sol is preferable. The noble metal is preferably employed in an amount of between 0.000001% to 0.01% by weight, especially between 0.00001% and 0.001% by weight, based on the weight of the monomers in the polymerization recipe.

The activation of the noble metals can be carried out in several ways. For instance, it is possible to prepare the noble metal sol in the presence of the above-identified metals in the form of their salts. On the other hand, it is possible, as well, to subsequently add the metal salts to the colloidal solutions of the noble metals. Last but not least, it is possible to add the noble metal sol and the metal salts separately to the polymerization starting material. The metal salts in all cases must be sufficiently soluble to give the required amounts of the metal ions.

The thus-obtained activated noble metal sols represent in connection with inorganic or organic per-compounds, and hydrogen or hydrogen-cleaving compounds, highly effective polymerization catalysts which have a great stability against contamination even at low temperatures.

Suitable as per-compounds are all inorganic per-compounds which are customarily employed in redox catalyst systems, such as hydrogen peroxide; alkali metal persulfates such as sodium persulfate, potassium persulfate, ammonium persulfate; alkali metal perborates; alkali metal perphosphates; alkali metal percarbonates; as well as organic per-compounds, particularly organic peroxides and hydroperoxides, such as tertiary-butyl hydroperoxide, cumene hydroperoxide, di-tertiary-butyl hydroperoxide, acetyl peroxide, benzoyl peroxide, lauroyl peroxide and 2,4-dichlorobenzoyl peroxide, as well as acetylcyclohexane sulfonyl peroxide. It is preferable to employ from 0.001% to 2%, particularly 0.001% to 0.5%, by weight, based on the weight of the monomers, of the per-compound in the polymerization recipe.

The partial pressure of the hydrogen used according to the invention as a redox catalyst system reducing agent for acceleration of the polymerization is preferably between 0.01 to 100, in particular, between 0.1 to 10, atmospheres (absolute).

The redox catalyst system of the invention is especially effective in polymerizations in an acid medium. The pH value of the aqueous dispersions may be between 0 and 6, preferably between 1 and 4. For the obtention of the desired pH-value, organic acids such as formic acid, acetic acid, propionic acid, oxalic acid, citric acid, tartaric acid, benzene sulfonic acid, toluene sulfonic acid, salicylic acid or inorganic acids such as hydrochloric acid, hydrobromic acid, perchloric acid, hydrofluoric acid or their acid salts, may be employed.

As is common in the polymerization of unsaturated organic compounds in an aqueous dispersion, the weight ratio of water to monomers is from 1:2 to 10:1, preferably 2:3 to 4:1.

As dispersing agents, all emulsifiers, either anion active, cation active or nonionic, and protective colloids which are customarily employed for polymerization of unsaturated organic compounds in aqueous dispersions may be used, either alone or in admixture with each other. Anion active emulsifiers are preferred.

Examples of such anionic active emulsifiers are the following: alkali metal salt, especially the sodium and potassium as well as ammonium salts of long chain fatty acids, such as lauric acid and stearic acid; of unsaturated long chain fatty acids, such as oleic acid; of resin acids, such as abietic acid; of acid phosphoric acid esters with long chain alkanols, such as sodium diethylhexyl phosphate; of acid fatty alcohol sulfuric acid esters; of paraffin sulfonic acids, such as those which are on the market under the trademark "Mersolate," of alkyl benzene or alkyl naphthalene sulfonic acids; and of sulfosuccinic acid dialkyl esters.

Cationic emulsifiers may also be used, such as dodecyl-trimethyl-ammonium bromide and amphoteric emulsifiers such as dodecyl betaine.

Examples of nonionic emulsifiers which may be used are the following: partial fatty acid esters of polyhydroxy alcohols, such as glycerin-monostearate, sorbitol monolaurate and sorbitol-monopalmitate; partial ethers of long chain alkanols and polyhydroxyalcohols; polyoxyethylene ethers of fatty alcohols or aromatic hydroxy compounds; polyoxyethylene esters of fatty acids; as well as polypropylene oxide-polyethylene oxide condensation products known in commerce under the tradename "Pluronics."

Examples of protective colloids which may be used are the following: polyvinyl alcohol which may contain up to 40 mol percent of acetyl groups; gelatins; gum arabic; cellulose ether derivatives, such as water-soluble methyl cellulose, carboxymethyl cellulose, hydroxyethyl cellulose, hydroxypropyl celluose; starch; polyvinyl pyrrolidone; salts of polyacrylic acids and alginic acid; water-soluble polyacrylamides; as well as copolymers of maleic acid or its hemiesters with vinyl compounds.

As is generally customary with polymerizations in aqueous dispersion, the amount of the ionic and nonionic emulsifiers is about 0.1% to 2% by weight, and the amount of the protective colloids is about 0.1% to 5% by weight, preferably 0.3% to 2% by weight.

The polymerization is conducted at temperatures of from $-50°$ C. to $+50°$ C. The preferred temperature range is between $-10°$ C. and $+50°$ C. With polymerizations which are carried out at temperatures below 0° C., the water is admixed with anti-freeze agents such as methanol, glycerine, ethylene glycol, ethylene glycol monoethers and sodium chloride.

Mono-olefins with from 2 to 6 carbon atoms, preferably 2 to 4 carbon atoms, can be copolymerized according to the process of the invention. Preferably, the mono-olefins are alkenes with from 2 to 6 carbon atoms, such as ethylene, propylene and isobutylene. The olefin content of the copolymers amounts to 5% to 60% by weight of the copolymerizate.

As further monomer components, all free-radical-polymerizable unsaturated compounds can be employed either individually or in combination. The following are examples of such monomers: vinyl esters of straight or branched carboxylic acids with up to 18 carbon atoms, for example, vinyl alkanoates such as vinyl acetate, vinyl propionate, vinyl laurate, vinyl pivalate, vinyl isotridecanoate; vinyl esters of branched chain alkanoic acids having from 9 to 20 carbon atoms such as vinyl esters of acids sold under the tradename "Versatic" acids; vinyl halides such as vinyl chloride, vinylidene chloride, vinyl fluoride; unsaturated mono- and di-carboxylic acids, for example, alkenoic acids, such as acrylic acid, methacrylic acid; alkenedioic acids such as maleic acid, fumaric acid, itaconic acid, citraconic acid; as well as the mono- or diester of the named acids with alkanols and alkanediols having from 1 to 12 carbon atoms such as methyl acrylate, methyl methacrylate, dimethyl maleate, diethyl maleate, di-n-butyl maleate, dimethyl fumarate, diethyl fumarate, di-n-butyl fumarate, di-ethylhexyl fumarate, hydroxyethyl acrylate, hydroxypropyl acrylate, hydroxyethyl methacrylate, hydroxypropyl methacrylate; n-vinyl compounds such as vinyl pyrrolidone and N-vinyl acetamide; unsaturated alcohols, for example, alkenols such as allyl alcohol, 2-methylbuten-3-ol-2; acrylamide; methylolacrylamide; vinyl sulfonate.

The polymerization according to the process of the invention may be performed continuously or by batch methods.

The polymerizate dispersions obtained thereby may be worked up according to known methods, such as by filtration, coagulation, spray drying or roller drying. The noble metals and other metals which may possibly remain in the polymerizate do not in any way interfere with the properties of the products obtained thereby because of their low reactivity and because of their extremely low concentrations. Moreover, they cause no discoloration of the polymerizates obtained.

The copolymers prepared according to the process of the invention possess interesting technical properties.

The products can be individually cross-linked peroxidically according to known methods into rubberlike articles with interesting technical properties. In addition, they can be employed in a mixture with other elastomers such as natural rubber, styrene-butadiene rubbers, acrylonitrile-butadiene-styrene types, ethylene-propylene copolymers, polybutadiene, and others.

Products such as molded articles, coated wires and cables, hot water-resistant packings, oil-resistant hoses and the like can preferably be prepared from the copolymerizates of the invention.

The following examples illustrate the practice of the invention. They, however, are not to be deemed limitative of the invention in any manner.

The parts indicated in the examples are always parts by weight.

EXAMPLE 1

In a stirrer autoclave, 150 parts of water, 1 part of a sodium salt of a paraffin sulfonic acid, 0.3 part potassium persulfate, 0.0001 part of palladium in a colloidal, aqueous solution and 0.00005 part of ammonium ferrous sulfate were admixed. The pH value of the aqueous liquor was adjusted with diluted hydrochloric acid to approximately 3. Then the autoclave was evacuated and 100 kg. of vinyl chloride were pumped into it. Subsequently, 30 kg. of ethylene were pumped in and then hydrogen was added to give approximately 1 atmosphere of excess pressure. The polymerization recipe was polymerized for 12 hours at $+40°$ C. while being stirred. It was calculated that a polymerization degree of approximately 90% was obtained as related to the vinyl chloride employed. The copolymerizate obtained had a K-value of 73 and an ethylene content of 10% by weight.

The product was excellently suited to be worked thermoplastically into foils, molded shapes and so forth.

EXAMPLE 2

100 parts of vinyl chloride were, according to Example 1, copolymerized at $+10°$ C. However, this time 0.5 part of potassium persulfate, 0.00015 part of a colloidal palladium sol, 0.0001 part of ammonium ferrous sulfate with 50 parts of ethylene were used.

After 15 hours, at a polymerization degree of approximately 90%, calculated on the vinyl chloride, the polymerization was interrupted. The copolymerizate had a K-value of 78 and an ethylene content of 14%.

EXAMPLE 3

In a polymerization recipe according to Example 1, 80 parts of vinyl chloride were polymerized with 20 parts propylene at 5° C. for approximately 20 hours. A polymerization degree of 90% was obtained, calculated on the vinyl chloride monomer. The K-value of the product was 64. The copolymer contained 8% by weight of propylene.

EXAMPLE 4

In accordance with the polymerization recipe of Example 1, 90 parts of vinyl chloride were copolymerized with 10 parts of isobutylene at 5° C. for approximately 20 hours. The polymerization degree was over 90%, calculated on the vinyl chloride monomer. The K-value of the product was 60. The copolymer contained 7% by weight of isobutylene.

EXAMPLE 5

In a stirrer autoclave, 100 parts of water, 20 parts of methanol, 1 part of methyl cellulose, 0.8 part of an alkylbenzene sulfonate, 0.015 part of a 1% palladium sol which had been prepared in the presence of 0.2 gm./atom of ammonium ferrous sulfate per gm./atom of palladium and 0.3 part of ammonium persulfate were admixed. The pH-value was adjusted to approximately 3 by means of dilute hydrochloric acid and 60 parts of vinyl acetate were added. Subsequently the autoclave was evacuated, cooled to $+10°$ C. and 60 parts ethylene were impressed. A pressure of approximately 50 atmospheres resulted. Subsequent to pumping approximately 1 excess atmosphere pressure of hydrogen into the autoclave, the polymerization recipe was polymerized for 15 hours at $+10°$ C. A polymerization degree of approximately 98% was obtained, calculated on the vinyl acetate employed. The copolymer contained 42% by weight of ethylene, had a K-value of 105, and a melting index $i_5$ of 0.2.

EXAMPLE 6

With a polymerization recipe according to Example 5, but with 0.015 part of a 1% palladium sol to which were added thereto 0.0001 part of ammonium ferrous sulfate, polymerization for 18 hours at $+10°$ C. was conducted. A copolymer containing 40% by weight of ethylene was contained at a polymerization degree of 98%, calculated on the vinyl acetate.

EXAMPLE 7

In a stirrer autoclave, 100 parts of water, 20 parts of methanol, 1 part of polyvinyl alcohol with a saponification number of 140, 0.8 part of an alkylbenzene-sulfonate, 0.3 part of ammonium persulfate, 0.015 part of a 1% palladium sol and 0.0001 part of copper sulfate were admixed. The pH-value of the polymerization recipe was adjusted to approximately 4 by means of formic acid. Then, 60 parts of vinyl acetate were added by pumping. The autoclave was evacuated, cooled to $+15°$ C. and 40 parts ethylene were empressed therein. After the pumping in of approximately 1 atmosphere of excess pressure of hydrogen, the polymerization recipe was polymerized for 14 hours at $+15°$ C. while being stirred. A polymerization degree of approximately 98% was obtained, calculated on the vinyl acetate. The copolymer contained 30% by weight of ethylene and had a K-value of 95.

EXAMPLE 8

In a stirrer autoclave, 120 parts of water, 20 parts of methanol, 1.2 parts of methyl cellulose, 1 part of an alkylbenzene sulfonate, 0.4 part of ammonium persulfate, 0.015 part of a 1% palladium sol and 0.0001 part of ammonium ferric sulfate were admixed. The pH-value of the mixture was adjusted to approximately 1 by means of hydrochloric acid. Then, the autoclave was evacuated and 30 parts of vinyl acetate, 30 parts of dibutyl fumarate and 60 parts of ethylene were added. Then 1 atmosphere of excess pressure of hydrogen was empressed and the polymerization recipe was polymerized for 22 hours at $+15°$ C. while being stirred. Through coagulation of the emulsion obtained, a rubberlike copolymerizate resulted with the following components:

| | Percent by wt. |
|---|---|
| Ethylene | 40 |
| Vinyl acetate | 30 |
| Dibutyl fumarate | 30 |

EXAMPLE 9

In accordance with Example 8, 30 parts of vinyl acetate, 30 parts of butyl acrylate and 60 parts of ethylene were polymerized for 20 hours at $+15°$ C. A rubberlike copolymerizate was obtained containing the following components:

| | Percent by wt. |
|---|---|
| Ethylene | 40 |
| Vinyl acetate | 30 |
| Butyl acrylate | 30 |

EXAMPLE 10

In a stirrer autoclave, a solution consisting of 77 parts of water, 12.8 parts of hydroxyethyl cellulose with an average of 1.5 hydroxyethyloxy groups per glucose anhydride unit and of a viscosity of 250 cp., as measured in a 2% aqueous solution, 14.5 parts of nonyl phenol polyethylene glycol ether with 20 ethylene oxide units per molecule, 0.8 part of tetrapropylene benzene sulfonate, 1 part of sodium vinyl sulfonate, 0.7 part of formic acid, 0.015 part of ammonium ferrous sulfate and 1 part of a 0.1% palladium sol, was charged. After removal of the atmospheric oxygen, the polymerization recipe was heated under stirring to 45° C. Ethylene was pumped into the autoclave until a pressure of 35 atmospheres was obtained. Thereupon, 1 atmosphere of excess pressure of hydrogen was charged. 640 parts of vinyl acetate and 40 parts of a 5% ammonium persulfate solution were pumped into the autoclave by a dosing pump in the course of 8 hours. Subsequent to a post reaction period of 2 hours, a highly viscous stable dispersion was obtained with an approximately 50% solids content. The copolymer has the following components:

|  | Percent by wt. |
|---|---|
| Vinyl acetate | 83 |
| Ethylene | 17 | and a K-value of 85.

The preceding specific embodiments are illustrative of the practice of the invention. It is to be understood, however, that other expedients known to those skilled in the art may be employed without departing from the spirit of the invention.

We claim:

1. In the process for the preparation of copolymerizates from alkenes having from 2 to 6 carbon atoms and free-radical polymerizable monomers selected from the group consisting of vinyl esters, vinyl halides, unsaturated mono- and dicarboxylic acids and their esters, N-vinyl compounds, unsaturated alcohols, acrylamide, methylolacrylamide, vinyl sulfonate and mixtures thereof which comprises the step of polymerizing said alkenes and said monomers in an aqueous dispersion utilizing a redox polymerization cataylst system comprising (1) an oxidizing agent selected from the group consisting of inorganic per-compounds, organic peroxides and organic hydroperoxides, (2) hydrogen and compounds splitting off hydrogen and (3) a colloidally dispersed noble metal of the VIII subgroup of the Periodic Table, the improvement which comprises utilizing from 0.000001% to 0.01% by weight, based on the monomers utilized, of said colloidally dispersed noble metal in combination with metallic ions selected from the group consisting of iron, copper, nickel, cobalt, chromium, molybdenum, vanadium, cerium and mixtures thereof, wherein the amount of said metallic ions is from 0.01 to 10 gm./atom per gm./atom of said noble metal and does not exceed 0.001% by weight, based on the monomers utilized, and conducting said polymerization at a temperature between $-50°$ C. and $+50°$ C.

2. The process as defined in claim 1 wherein said colloidally dispersed noble metal is present in an amount of from 0.000001% to 0.001% by weight, based on the monomers utilized, in combination with said metallic ions in an amount of from 0.1 to 5 gm./atom per gm./atom of said noble metal.

3. The process as defined in any one of claims 1 and 2 wherein said colloidally dispersed noble metal is an aqueous palladium sol.

4. The process as defined in any one of claims 1, 2 and 3 wherein said metallic ions are selected from the group consisting of iron ions and copper ions.

5. The process as defined in any one of claims 1, 2, 3 and 4 wherein said polymerization is conducted at a temperature between $-10°$ C. and $+50°$ C.

References Cited

UNITED STATES PATENTS 3,145,194  8/1964  Heckmaier _____ 260—79.3

JOSEPH L. SCHOTER, Primary Examiner

R. S. BENJAMIN, Assistant Examiner

U.S. Cl. X.R.

252—430, 472; 260—80.73, 80.75, 80.8, 80.81, 86.3, 86.7, 87.5, 88.1

UNITED STATES PATENT OFFICE
CERTIFICATE OF CORRECTION

Patent No. 3,563,963     Dated February 16, 1971

Inventor(s)   Gerhard Beier et al.

It is certified that error appears in the above-identified patent and that said Letters Patent are hereby corrected as shown below:

The following information was omitted from the top of column 1:

>    Claims priority, application Germany,
>
>    December 7, 1967, W 45, 298

Signed and sealed this 28th day of November 1972.

(SEAL)
Attest:

EDWARD M. FLETCHER, JR.            ROBERT GOTTSCHALK
Attesting Officer                  Commissioner of Patents